United States Patent [19]

Fisher et al.

[11] Patent Number: 4,808,323

[45] Date of Patent: Feb. 28, 1989

[54] NON-DELETERIOUS DRY FILM LUBRICANT COATING COMPOSITION, RUBBER SEALING ELEMENT COATED THEREWITH; AND METHOD OF

[75] Inventors: Eugenia T. Fisher, Ann Arbor, Mich.; William D. Best, Huntington Beach, Calif.

[73] Assignee: Federal-Mogul Corporation, Southfield, Mich.

[21] Appl. No.: 914,197

[22] Filed: Oct. 1, 1986

[51] Int. Cl.$^4$ .................................... C10M 105/12
[52] U.S. Cl. .................................... 252/15; 252/52 R; 252/54
[58] Field of Search .................. 252/52 R, 54, 15, 19

[56] References Cited

U.S. PATENT DOCUMENTS

| B 181,208 | 3/1976 | Feinstone | 252/15 |
|---|---|---|---|
| 2,346,124 | 4/1944 | Dew | 252/52 R |
| 2,350,570 | 6/1944 | Schilling | 252/52 R |
| 2,990,371 | 6/1961 | Ellenson | 252/52 R |
| 3,878,112 | 4/1975 | Luck | 252/15 |

FOREIGN PATENT DOCUMENTS

| 0501350 | 3/1954 | Canada | 252/52 R |
|---|---|---|---|
| 0003892 | 1/1982 | Japan | 252/15 |
| 0096684 | 5/1985 | Japan | 252/15 |
| 0161486 | 8/1985 | Japan | 252/52 R |
| 0255894 | 12/1985 | Japan | 252/52 R |

*Primary Examiner*—William R. Dixon, Jr.
*Assistant Examiner*—James M. Hunter, Jr.
*Attorney, Agent, or Firm*—Lawrence J. Shurupoff; Robert F. Hess

[57] ABSTRACT

A non-deleterious coating composition for the deposition of a dry film lubricant coating on a rubber sealing element comprises:

(a) 1 to 10% by weight of a component selected from the group consisting of waxes and normally solid aliphatic alcohols;

(b) 1 to 10% by weight of a lubricating oil; and (c) the balance being a solvent for (a) and (b); wherein the solvent, when applied to the rubber sealing element, in said coating composition, evaporates from the coating composition before any substantial degradation of the physical properties of the rubber sealing element occurs. A method for coating a rubber sealing element and the rubber sealing element coated with the dry film lubricant are also disclosed. The invention finds particular applicability in the lubrication of rubber sealing elements, e.g., O-rings, which will be utilized in the manufacture of devices by automated assembly techniques.

16 Claims, No Drawings

NON-DELETERIOUS DRY FILM LUBRICANT COATING COMPOSITION, RUBBER SEALING ELEMENT COATED THEREWITH; AND METHOD OF

BACKGROUND OF THE INVENTION

1. Field of the Invention:

The present invention relates to rubber sealing elements coated with non-deleterious dry film lubricants and to coating compositions for the deposition of such dry film lubricants. More particularly, the present invention relates to a non-deleterious coating composition for the deposition of a non-deleterious dry film lubricant on a rubber sealing element, the rubber sealing element with such a non-deleterious dry film lubricant coated thereon, and a method of coating rubber sealing elements with such non-deleterious dry film lubricant coatings.

DESCRIPTION OF THE PRIOR ART:

In the assembly of devices utilizing rubber or elastomeric sealing elements (hereinafter "rubber sealing elements"), e.g., O-rings, it has been found that coating the rubber sealing element with a dry film lubricant is desirable to reduce standing and sliding friction whereby automated assembly operations are facilitated. Moreover, such a dry film lubricant will aid in the prevention of installation damage to the sealing device, e.g., galling, cutting, nicking, roll-over or tearing. However, proprietary systems for the provision of such dry film lubricants have typically utilized chlorinated solvents and a paraffin wax as the coating composition. Such systems are not acceptable due to existing laws and regulations promulgated by the Environmental Protection Agency (EPA) prohibiting the use of such chlorinated solvents for industrial applications.

Applicants have now developed a non-deleterious composition for the deposition of the dry film lubricant and a method of coating which overcomes the problems of the prior systems. The novel dry film lubricant of the present invention comprises either a wax or a normally solid aliphatic alcohol and a lubricating oil. Various lubricating compositions utilizing alcohols and utilizing lubricating oils are known in the art.

In particular, Tubb, U.S. Pat. No. 3,791,970, discloses a solid lubricant comprising cetyl alcohol and tricresyl phosphate, the tricresyl phosphate being present in an amount of 2-50% by weight, preferably 35-50% by weight. The material is formed by melting cetyl alcohol, adding the tricresyl phosphate to the molten alcohol, and allowing the so-formed mixture to solidify after casting into a desired shape. The so-formed solid lubricant can be applied to still or moving tools, such as drills, mills or saw blades by merely rubbing it thereagainst. Comparative testing, set forth in the working examples, indicates that cetyl alcohol, per se, is ineffective as a lubricant.

Unich et al, U.S. Pat. No. 3,899,433, discloses lubricating compositions consisting essentially of mixtures of normal alcohols and branched chain primary alcohols wherein the alcohols are pure or are mixtures with regard to molecular weight and have from about 20 to about 34 carbon atoms per molecule. The compositions may be extended with diluents such as paraffins; olefin/paraffin mixtures; aerosol propellants; with lubricating oil; with halohydrocarbons or with aqueous media, particularly in conjunction with surface active agents.

Brook et al, U.S. Pat. No. 3,679,585, discloses lubricating compositions comprising lubricating oil, an oil-soluble succinimide dispersant and an oil-soluble alcohol or ester. The oil soluble alcohol enhances the dispersancy effect of the succinimide dispersant additive.

Jenks, U.S. Pat. No. 3,252,909, discloses impact extrusion lubricants comprising a mixture of at least one saturated monohydric aliphatic alcohol containing 14-30 carbon atoms and at least one aliphatic compound selected from the group consisting of saturated monocarboxylic aliphatic acids containing 14 to 30 carbon atoms and the myricyl alcohol esters and Group II metal salts of those aliphatic acids.

Rosen, U.S. Pat. No. 2,089,506, discloses a lubricant in crayon, stick or brick form comprising about 50% wax; from 1-15%, preferably 5%, mica; and oil, as the remainder of the composition. The lubricant, molded in sticks or bars, has a brittle character. However, when the sticks are worked or used they become plastic-like.

Kirksey, U.S. Pat. No. 4,242,861, discloses a solid lubricant comprising a minor amount of lubricating oil and a major amount of paraffin wax.

Thus, there is a continuing need for a dry film lubricant and a method and composition for depositing such a dry film lubricant on a rubber sealing element.

SUMMARY OF THE INVENTION

It is, therefore, an object of the invention to provide a composition for deposition of a dry film lubricant on a rubber sealing element without detrimental effects on the rubber element.

It is a further object of the present invention to provide a dry film lubricant-coated rubber sealing element.

It is a still further object of the present invention to provide a method for coating a rubber sealing element with a dry film lubricant.

These objects of the invention, and others as will become apparent hereinafter, have been accomplished by the provision of a non-deleterious coating composition for deposition of a dry film lubricant coating on a rubber sealing element comprising:

(a) 1 to 10% by weight of a component selected from the group consisting of waxes and normally solid aliphatic alcohols;

(b) 1 to 10% by weight of a lubricating oil; and (c) the balance being a solvent for (a) and (b); the solvent, when applied to the rubber sealing element, in the coating composition, evaporating from the coating composition before any substantial degradation of the physical properties of the rubber sealing element occurs.

In a further aspect, the present invention provides a method of coating a rubber sealing element with a non-deleterious dry film lubricant comprising:

(A) providing a non-deleterious coating composition comprising:

(a) 1 to 10% by weight of a component selected from the group consisting of waxes and normally solid aliphatic alcohols;

(b) 1 to 10% by weight of a lubricating oil; and (c) the balance being a solvent for (a) and (b); the solvent, when applied to the rubber sealing element, in the coating composition, evaporating from the coating composition before any substantial degradation of the physical properties of the rubber sealing element occurs;

(B) coating the rubber sealing element with the coating composition of step (A); and (C) evaporating the solvent from the so-coated rubber sealing element.

In a still further aspect, the present invention provides a rubber sealing element coated with a non-deleterious dry film lubricant wherein the non-deleterious dry film lubricant comprises:

1-10 parts by weight of a component selected from the group consisting of waxes and normally solid aliphatic alcohols; and 1-10 parts by weight of a lubricating oil.

DETAILED DESCRIPTION OF THE INVENTION

The present invention provides a non-deleterious dry film lubricant coating composition for application to rubber sealing elements, e.g., O-rings, gaskets, etc. By non-deleterious, it is meant that neither the components of the dry film lubricant nor the additional components of the composition for deposition of the dry film lubricant adversely affect the physical structure and/or properties of the rubber sealing element. In this regard, it should be noted that many of the materials, i.e. rubbers or elastomers, that are utilized in the formation of sealing elements, such as O-rings and the like, are susceptible to solvent attack. This solvent attack may manifest itself as a mere swelling of the rubber article or, in the most severe cases, may involve the actual dissolution (physical destruction) of the article. As is self-evident, in either case, the integrity of the seal produced by the O-ring or the ease of assembly of the seal utilizing the O-ring may be comprised by solvent attack on the rubber article. Nonetheless, it has been proven to be desirable to lubricate such sealing elements, so as to ease the assembly of sealing devices utilizing such rubber sealing elements, especially where automated assembly techniques are utilized. In these instances, the provision of a dry film lubricant has been found to substantially improve productivity of automated assembly machines. However, Applicants have discovered that many solvent systems and/or lubricant components can cause a degradation in the physical properties of a rubber sealing element without visible change in the sealing element itself. Accordingly, the present invention comprises the provision of a non-deleterious coating composition for depositing a non-deleterious dry film lubricant on the surface of a rubber sealing element.

Rubber sealing elements within the scope of the present invention include O-rings, gaskets, etc. These sealing elements may be formed from: (1) natural rubber, which has good mechanical properties, is impervious to water, fair to good resistance to acids and alkalies, and has poor resistance to oils and gasoline; (2) styrene-butadiene rubber (SBR), which has better water resistance than natural rubber, fair to good resistance to acids and alkalies and is unsuitable for use with gasoline and oils; (3) butyl rubber (isobutylene-isoprene) which has very good resistance to water, alkalies and many acids, and poor resistance to oils and gasoline; (4) nitrile rubber (butadiene-acrylonitrile), which has very good water resistance, excellent resistance to oils and gasoline and fair to good resistance to acids and alkalies; (5) polysulfide rubber, which has excellent resistance to oils, gasoline, aliphatic and aromatic hydrocarbon solvents, very good water resistance, good alkali resistance and fair acid resistance, but, poor mechanical properties; (6) neoprene rubber (chloroprene), which has excellent mechanical properties, good resistance to non-aromatic petroleum, fatty oils and solvents (except aromatic, chlorinated or ketone types), good water resistance and alkali resistance, and fair acid resistance; (7) silicone rubber (polysiloxane), which has excellent heat resistance, fair water resistance, fair to good acid and alkali resistance and poor resistance (except fluorosilicone rubber) to oils and solvents; (8) acrylic rubber, which has good heat resistance but poor cold resistance, good resistance to oils and aliphatic and aromatic hydrocarbons, poor resistance to water, alkalies and some acids; (9) chlorosulfonated polyethylene, which has excellent resistance to oxidizating chemicals, ozone and weathering, relatively good resistance to oils and grease, poor resistance to aromatic or chlorinated hydrocarbons, and good mechanical properties; (10) fluorocarbon elastomers which can be used at high temperatures with many fuels, lubricants, hydraulic fluids and solvents, highly resistant to ozone and weathering and good mechanical properties; (11) synthetic rubber (polyisoprene) which has good resistance to heat, poor resistance to aliphatic and aromatic hydrocarbons, as well as oil and gasoline, fair to good resistance to acids and excellent water resistance; (12) butadiene rubber (polybutadiene) which has good resistance to heat, poor resistance to aliphatic and aromatic hydrocarbons, as well as oil and gasoline, and excellent water resistance; (13) EPDM rubber (ethylene/propylene/diene monomer) which has good to excellent resistance to water, acids and alkalies, poor resistance to aliphatic hydrocarbons and halogenated hydrocarbons, fair resistance to aromatic hydrocarbons and poor to fair resistance to synthetic lubricants such as diesters; and other conventional rubbers and elastomers used for this purpose.

The non-deleterious coating composition comprises the components of the dry film lubricant and a solvent carrier therefor. The dry film lubricant, in turn, comprises a first component which acts as a binder for the lubricating oil of the lubricant and as a protectant for inhibiting any attach on the rubber sealing element by the lubricating oil; and a lubricating oil which supplies the requisite degree of lubricity.

The first component of the dry film lubricant may be selected from the group consisting of waxes and normally solid aliphatic alcohols. Suitable waxes include natural waxes such as beeswax, spermaceti, carnauba wax, candelilla wax, montan wax, ozocerite wax (ceresin wax), paraffin waxes and petrolatum waxes, amongst others; and synthetic waxes such as long-chain polymers of ethylene, long-chain polymers of ethylene oxide combined with a dihydric alcohol, e.g. polyoxyethylene glycol ("Carbowax"), chlorinated naphthalenes ("Halowaxes"), waxy polyol ether-esters, e.g., polyoxyethylene sorbitol, synthetic hydrocarbon waxes (Fischer-Tropsch waxes), straight-chain wax-like ketones, e.g., laurone, palmitone and stearone, and cylic ketones, e.g., phenoxyphenyl heptadecyl ketone, amide derivatives of fatty acids, phthalimide waxes, polyoxyethylene fatty acid esters (e.g., "Carbowax 4000 (Mono) Stearate"), amongst others. Paraffin waxes are preferred due to their ready availability.

Preferably, however, the first component of the dry film lubricant is selected from amongst the normally solid aliphatic alcohols, i.e. those aliphatic alcohols having at least 12 carbon atoms. Suitable aliphatic alcohols include dodecyl (lauryl) alcohol, tetradecyl (myristyl) alcohol, hexadecyl (cetyl) alcohol, octadecyl (stearyl) alcohol, eicosyl (arachidic) alcohol, docosyl alcohol, tetracosyl alcohol, hexacosyl (ceryl) alcohol, octacosyl alcohol and triacontyl (myricyl) alcohol, amongst others. Preferably, the alcohols having 14 to 30 carbon atoms are utilized, and, most preferably, hexadecyl (cetyl) alcohol is utilized because of the smooth glossy finish that it gives to the coated rubber sealing element, as compared to the whitish, caked appearance of the other alcohols and/or waxes.

The lubricating oils utilizable in the present invention include petroleum lubricating oils as well as synthetic lubricating oils. The lubricating oil may be a hydrocarbon lubricating oil having a viscosity in the range of from about 1 to about 4,000 centistokes at 100° F.; but, preferably, is a hydrocarbon lubricating oil having a viscosity in the range of from about 20 to about 200 centistokes at 100° F. In this regard, it should be noted that petroleum lubricating oils consist essentially of complex mixtures of hydrocarbon molecules ranging from the low viscosity oils with molecular weights as low as about 250 to very viscous oils with molecular weights of 1,000 or more, based on structures containing 20–70 carbon atoms. They may be classified broadly as (1) straight-chain paraffins, (2) branched-chain paraffins, (3) naphthenes (one or more saturated 5 or 6 membered rings with paraffin side chains), (4) aromatics (benzene ring structures with paraffinic side chains), and (5) mixed aromatic-naphthene-paraffin.

Of the above classes, the most desirable are the branched chain paraffins and the naphthenes. The refining processes for production of petroleum lubricating oils are generally directed to increasing the concentration of these fractions and the removal of the others, as well as of organic compounds containing sulfur, oxygen and nitrogen which are found in varying proportions in crude oil.

In the distillation of petroleum crude oils, the lower boiling gasoline, kerosene and fuel oils are removed first, and the lubricating oil fractions are divided by boiling point range into several grades of neutral distillates and a more viscous residue sometimes called a cylinder stock. Subsequent refining steps are directed at removing undesirable aromatics and the minor portion of sulfur, oxygen and nitrogen compounds present. In the past this was accomplished by treatment with sulfuric acid or by solvent extraction, however, hydrogen treatment at high pressure in the presence of a catalyst has become the most popular refining process. Thus, very mild hydrofining involves, primarily, only removal of color and some nitrogen and sulfur compounds, whereas, severe hydrofining or hydrocracking alters the chemical structures to convert aromatics to paraffins and naphthenes.

A very highly refined lubricating oil, such as ASTM Reference Oil #1, has been found to be especially suitable for the present invention since this has been found to be non-deleterious to the rubber sealing element, per se, i.e. the least aggressive when contacted with the rubber sealing element.

Of course, as previously noted, synthetic lubricating oils may also be used in the present dry film lubricant formulation provided that they are non-deleterious to the rubber sealing element. For instance tricresyl phosphate would be an unlikely candidate for the present invention since the phosphate esters are known to be good solvents for polymers (such as rubbers and plastics). Whereas, organic esters, such as the esters derived from adipic ($C_6$), azelaic ($C_9$) or sebacic ($C_{10}$) acids and $C_{6-9}$ branched chain alcohols; polyglycols (derived from propylene oxide and/or ethylene oxide) or diethers or diesters thereof; synthetic hydrocarbons, derived from polymerized isobutylene (containing some 1- and 2-butene) or various polymers of other alpha-olefins and ethylene; silicones, such as methyl silicone ormethyl phenyl silicone; polyphenyl ethers; and silicate esters would be suitable.

The solvent utilized in the coating composition of the present invention must be capable of dissolving the combination of the first component and the lubricating oil of the dry film lubricant, while being non-deleterious to the rubber sealing element which will be contacted with the solvent. As will become apparent hereinafter, the solvent is considered to be non-deleterious to the rubber sealing element, if in the time from first contact with the rubber sealing element to the completion of evaporation of the solvent therefrom (with the concomitant deposition of a dry film lubricant coating on the rubber sealing element) no substantial degradation of the physical properties of the rubber sealing element occurs. Solvents which have been found to be particularly useful in this regard are fluorine-containing halogenated hydrocarbons, particularly, the chlorofluorocarbon compounds known as "Freons ®" and, most particularly, those which are liquid at room temperature (20° C.). In a particularly preferred embodiment, trichlorotrifluorethane, i.e. 1,1,2-trichloro-1,2,2 trifluoroethane, is utilized as the solvent. The solvent may contain additional components which aid in the dissolution of the various members of the dry film lubricant formulation, e.g., lower molecular weight (non-solid) alcohols such as isopropyl alcohol.

The coating compositions of the present invention may be readily prepared by heating the wax or the normally solid aliphatic alcohol to its melting point and then rapidly adding the lubricating oil and solvent while mixing. In a particularly preferred embodiment, 2 grams of cetyl alcohol (available from Vista Chemical Company, Westlake, La., under the tradename ALFOL ® 16 Alcohol, N. F.—Flaked) may be heated to its melting point of 13°–122° F. After the cetyl alcohol is melted, 6 ml of isopropyl alcohol (Burdick & Jackson Laboratories, Muskegon, Mich.), 90 ml of 1,1,2-trichloro-1,2,2-trifluoroethane (available from E. I. du Pont de Nemours & Co., Wilmington, Del., under the trademark FREON ® TF Solvent) and 2 ml of ASTM Reference Oil #1 (available from PENRECO, Los Angeles, Calif., a PENNZOIL Division) may be rapidly mixed therewith to form the preferred coating composition of the present invention after cooling to room temperature.

The coating compositions of the present invention will be utilized to deposit a dry film lubricant comprising 1–10 parts by weight of a component selected from the group consisting of waxes and normally solid aliphatic alcohols and 1–10 parts by weight of a lubricating oil on a rubber sealing element, e.g. a rubber O-ring. In this regard, the coating composition of the present invention will be applied to a rubber sealing element, such as an O-ring, by spraying or dipping and then the solvent will be allowed to evaporate from the coated article to deposit the dry film lubricant thereon.

In the preferred embodiment of the present invention, a dip and spin technique is contemplated for the deposition of the desired dry film lubricant. In particular, a coating bath comprising 1–10% by weight of cetyl alcohol, 1–10% by weight of ASTM Reference Oil #1, 70–98% by weight of 1,1,2-trichloro-1,2,2-trifluoroethane and 1–10% by weight of isopropyl alcohol is provided. A plurality of rubber O-rings are loaded into a wire mesh container and the container is immersed in the coating bath for approximately 10 seconds. The container is removed from the coating bath and momentarily allowed to drain excess fluid back into the bath. The container, filled with the rubber O-rings, is then spun at high RPM (e.g. 100 RPM or higher) to throw off any entrained coating solution and to aid in drying (solvent evaporation) of the coating composition coated on the surfaces of the O-rings. After completion of the solvent evaporation, the coated O-rings may be directly loaded into cartons for shipment.

As will be appreciated from the above description of the preferred coating procedure, Applicants have developed a test to determine the suitability of a solvent or solvent system for utilization in the present invention. In particular, a number of O-rings are immersed in a proposed solvent or solvent system for 10 seconds, the O-rings are then removed from the solvent bath, allowed to drain momentarily and then spun dry. The O-rings are then tested to determine whether there has been any substantial degradation in physical properties. In this regard a decrease of 10% or more in any of tensile strength (ASTM D 412), elongation (ASTM D 412) or Young's modulus is considered to constitute substantial degradation of physical properties, and any solvent or solvent system producing such a substantial degradation of physical properties is considered to be unacceptable. The testing is carried out at the contemplated temperature of process operation, normally room temperature, however, higher temperatures may be utilized in the process to speed up solvent evaporation.

In a similar manner, the components of the dry film lubricant coating can be tested for compatibility with the rubber sealing elements by forming a coating thereon with a known non-deleterious solvent system and testing the rubber sealing element for physical property degradation, as above, over a period of time, i.e. 3–6 months or up to a year or longer depending on intended service application.

In addition to aiding the automated assembly of devices utilizing the presently contemplated dry film lubricant-coated sealing devices, the dry film lubricant of the present invention also finds utility in any application requiring a reduction in standing or sliding friction; any application requiring lubricity for initial start-up or run-in and occasional dynamic action of an elastomeric sealing device; any application for quick disconnect requiring low push-in and push-out forces or where there is a need for torque reduction; and unique installation applications having tight tolerances and requiring external lubricity as an aid in proper alignment.

What is claimed is:

1. A non-deleterious coating composition for the deposition of a dry film lubricant coating on a rubber sealing element comprising:
   (a) 1 to 10% by weight of a component selected from the group consisting of waxes and normally solid aliphatic alcohols;
   (b) 1 to 10% by weight of a lubricating oil; and
   (c) the balance being a solvent for waxes and normally solid aliphatic alcohols and lubricating oils;
   said solvent, when applied to said rubber sealing element, in said coating composition, evaporating from said coating composition before any substantial degradation of the physical properties of said rubber sealing element occurs.

2. The non-deleterious coating composition according to claim 1, wherein said normally solid aliphatic alcohol has 14 to 30 carbon atoms.

3. The non-deleterious coating composition according to claim 1, wherein said normally solid aliphatic alcohol is cetyl alcohol.

4. The non-deleterious coating composition according to claim 1, wherein said wax is paraffin wax.

5. The non-deleterious coating composition according to claim 1, wherein said lubricating oil is a hydrocarbon lubricating oil having a viscosity in the range of from about 1 to about 4,000 centistokes at 100° F.

6. The non-deleterious coating composition according to claim 1, wherein said lubricating oil is a hyrocarbon lubricating oil having a viscosity in the range of from about 20 to about 200 centistokes at 100° F.

7. The non-deleterious coating composition according to claim 1, wherein said lubricating oil is ASTM Reference Oil #1.

8. The non-deleterious coating composition according to claim 1, wherein said solvent comprises a fluorine-containing halogenated hydrocarbon.

9. The non-deleterious coating composition according to claim 1, wherein said solvent comprises a chlorofluorocarbon compound.

10. The non-deleterious coating composition according to claim 1, wherein said solvent comprises a trichlorotrifluoroethane.

11. The non-deleterious coating composition according to claim 10, wherein said trichlorotrifluoroethane is 1,1,2-trichloro-1,2,2-trifluoroethane.

12. The non-deleterious coating composition according to claim 9, wherein said solvent further comprises a minor portion of isopropyl alcohol.

13. The non-deleterious coating composition according to claim 1, comprising:
   1 to 10% by weight of cetyl alcohol;
   1 to 10% by weight of ASTM Reference Oil #1;
   70 to 98% by weight of 1,1,2-trichloro-1,2,2-trifluoroethane; and
   0 to 10% by weight of isopropyl alcohol.

14. The non-deleterious coating composition according to claim 13, wherein said isopropyl alcohol is present in an amount of about 2–5% by weight.

15. A dry film lubricant which is non-deleterious to rubber sealing elements, comprising:
   1–10 parts by weight of a component selected from the group consisting of waxes and normally solid aliphatic alcohols; and
   1–10 parts by weight of a lubricating oil.

16. The dry film lubricant according to claim 15, wherein said normally solid aliphatic alcohol is cetyl alcohol and said lubricating oil is ASTM Reference Oil #1.

* * * * *